INVENTOR.
HARRY A. STEELE
BY Bodell and Thompson
ATTORNEYS.

INVENTOR.
HARRY A. STEELE.
BY Bodell and Thompson
ATTORNEYS.

Patented Apr. 22, 1941

2,239,205

UNITED STATES PATENT OFFICE 2,239,205

DIRECTION INDICATOR CONTROL

Harry A. Steele, Syracuse, N. Y., assignor to Protectall Motor Signal, Inc., Syracuse, N. Y., a corporation of New York Application December 21, 1939, Serial No. 310,310

5 Claims. (Cl. 200—59)

This invention relates to direction indicators for motor vehicles, and particularly a control therefor, as a switch, by means of which the indicator is set, at will, to indicate a right or left turn, and has for its object a resetting device for restoring the operating member or lever of the control to neutral or starting position, upon turning of the steering wheel of the vehicle into straight position, after a right or left turn has been made, which resetting device is normally out of the path of movement of a knock-off element or elements on the steering wheel, as the spokes of the steering wheel, so that the wheel may be turned in ordinary driving without encountering the resetting device, and is movable into the path of the knock-off element or elements upon operation of the control member or lever into position to cause the indicator to indicate a right or left turn, and when in such position, is capable of ratcheting during the turning of the steering wheel in making a turn, but upon the straightening up movement of the wheel after making a right or left turn is in the path of the knock-off element or elements a sufficient length of time to return the lever to its starting position, and the resetting device in its normal position out of the path of movement of the knock-off element or elements.

More specifically, it has for its object a resetting device mounted on the control lever to tilt or shift about an axis extending lengthwise of the lever, with means normally tending to hold it from tilting and to return it to its normal position, when it is free of the force tending to tilt it, and mechanism for tilting the same when the control lever has been shifted from starting or neutral position, the tilting movement moving the end of the pivoted resetting device into the path of movement of the knock-off element or elements, but also permitting a ratcheting movement thereof about its axis while the steering wheel is being turned in making a right or left turn but initially preventing the ratcheting movement during retrograde movement of the steering wheel, in order to transmit to the control lever a starting impulse sufficient to return it to neutral position, where the resetting device is out of the path of movement of the knock-off elements.

The invention consists in the novel features and in the combinations and constructions hereinafter set forth and claimed.

In describing this invention, reference is had to the accompanying drawings in which like characters designate corresponding parts in all the views.

Figure 1:
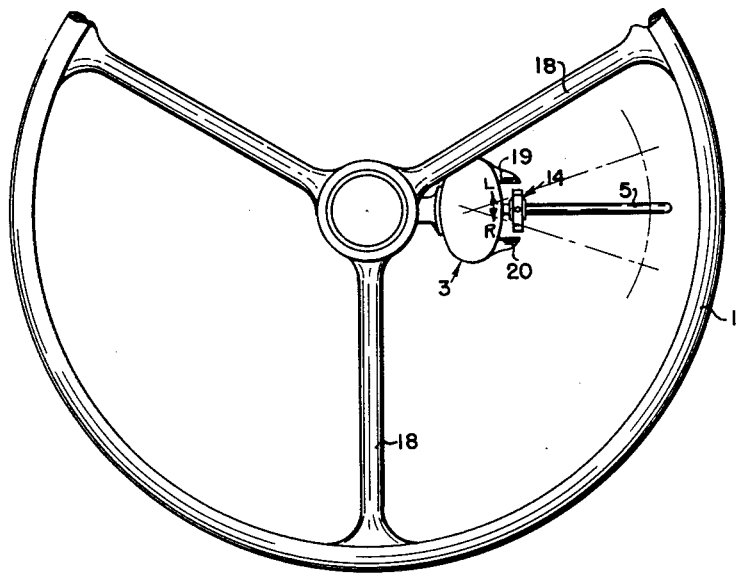
Figure 1 is a fragmentary plan view of a steering wheel of a motor vehicle.
Figure 2:
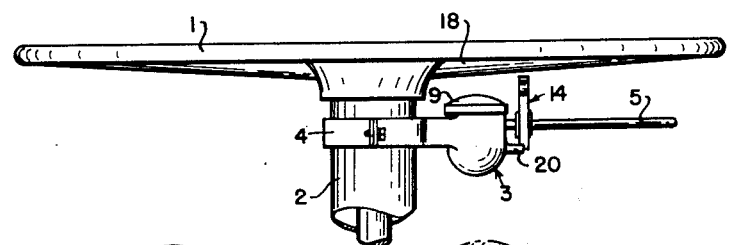
Figure 2 is an elevation looking upwardly in Figure 1.

I designates the hand steering wheel of a motor vehicle; 2 the steering column.

3 designates the control switch, which is supported on the steering column below the steering wheel in any suitable manner, as by a clamp 4.

5 designates the operating member or lever of the switch, this being pivoted at 6 within the housing 7 of the switch, the pivot 6 being a spindle operating a suitable switch contact arm within or associated with a switch block 8 in the housing 7. The housing 7 has a suitable removable cover 9. The switch lever 5 is provided with suitable means, as spring-pressed poppets 10 coacting with suitable seats or depressions 11 in a partition or plate 12 in the housing 7 to hold or locate the switch lever 5 in starting or central position, and also coacting with shallower depressions 11a on opposite sides of the depressions 11 for coacting therewith, when the switch lever is moved fore or aft from central or neutral position. As the control switch and the lever 5 are here shown as mounted upon the right hand side of the steering column, when a left hand turn is to be made, and the steering wheel turned anticlockwise, the lever is preset from neutral in an anticlockwise direction; when a right hand turn is to be made and the steering wheel turned in a clockwise direction, the lever 5 is moved in a clockwise direction from neutral position. The operation of the switch by the movement of the lever 5 causes the signal to indicate a right or left turn in accordance with the direction the operating lever is turned, as is well understood.

14 designates the resetting member, and as the control means or switch is operable to set a signal to turn right or left, instead of just one turn, as a left turn, the resetting member 14 is shown as double or bifurcated, or Y-shaped in general form. This resetting member is carried by the lever 5 to move therewith as a unit, and also is mounted to have a rocking or tilting movement about an axis extending radially or lengthwise of the lever.

Figure 3:
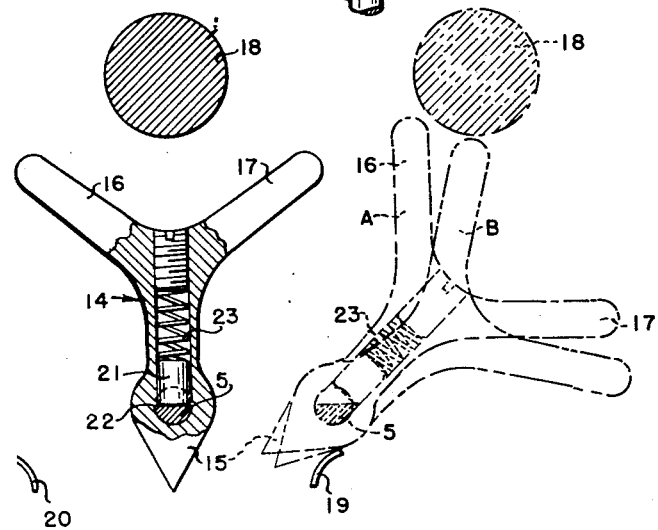
Figure 3 is an enlarged fragmentary sectional view showing the normal position of the control lever and the steering wheel and the operating position and ratcheting operation of the resetting device when the lever is moved into operated position.
Figure 4:
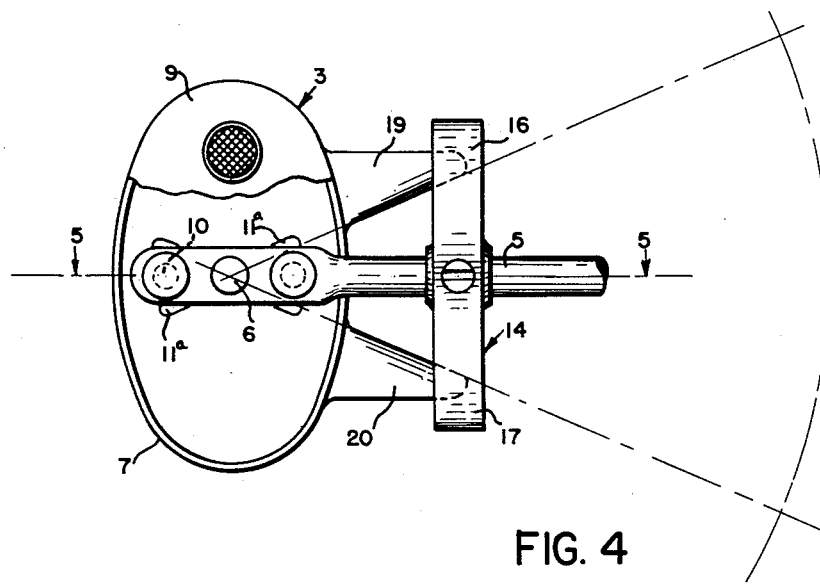
Figure 4 is an enlarged plan view of the indicator control or switch.
Figure 5:
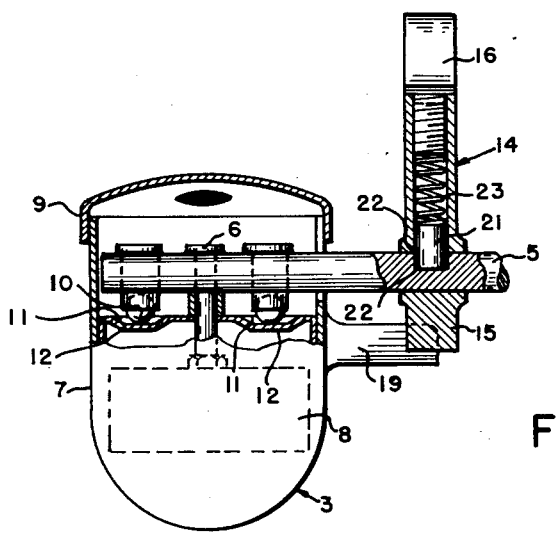
Figure 5 is a sectional view on line 5—5, Figure 4.

The operating lever 5 is shown as provided with a round shank and the resetting member provided with an opening for receiving the round shank. It also has a cam or arm 15 extending beyond or below the lever 5. When the lever 5 is in normal position, the ends of the arms 16, 17 of the Y formation are located out of the path of the knock-off elements on the steering wheel, these elements in the illustrated embodiment of the invention being the spokes 18 of the steering wheel. The end of one arm 16 or 17 is movable into the path of movement of the knock-off element 18 when the lever 5 is shifted from neutral position into either of its shifted positions A and is returned to neutral position by the pivotal movement of the resetting member 14 about the lever 5. Means is provided for effecting such pivotal movement. This means consists of shoulders or abutments 19, 20 projecting from the switch housing 7 on opposite sides of the lever 5 in position to be engaged by the arm or cam 15 when the switch operating member or lever 5 is shifted from neutral in one direction or the other. During the pivotal or tilting movement of the resetting lever 14 by reason of the engagement of the cam or arm 15 with one or the other of the abutments 19, 20, the end of one of the arms 16, 17 or of the Y formation moves in an arc, as seen in Figure 3, from the full line position to the dotted line position, into the path of movement of the knock-off element or spoke 18. During the movement of the steering wheel to make a turn, the spoke 18 ratchets over the arm 16 or 17 with which it is engaged, causing the resetting member to move about its axis slightly, and during this movement, the lever 5 and the cam or arm 15 is restricted from further longitudinal movement by the abutment 19 or 20 with which it is engaged, and the resetting member immediately returns it to its former tilted position in which the cam 15 is engaged with the abutment 19 or 20 after the spoke ratchets passed the end of the arm 16 or 17 of the Y formation. This ratcheting movement is effected by yielding means, as a spring, which also serves to return the resetting member to upright position, when the lever has received its starting impulse back to neutral position. This yielding or spring means is here shown as a plunger 21 located in the leg of the Y formation and coacting with a notch or seat 22 in the lever 5, the plunger being pressed by a spring 23 also located in the leg of the Y formation. The notch is here shown as formed with a flat bottom, and the plunger with a flat end, the notch being formed by providing a cylindrical shank of the lever with a transverse slot, the bottom of which extends nearly diametrically of the lever.

Assuming that a left hand turn is to be made, the operation is as follows: The operating lever 5 is moved from its neutral or central position upwardly in Figure 1 or from the position shown in full lines (Figure 3) to that shown in dotted lines. At the end of such movement, the cam or arm 15 engages the abutment 19 causing the resetting member 14 to tilt into dotted line position A (Figure 3). The tilting movement of the resetting member moves the end of the arm 16 of the Y formation into the path of movement of spokes 18 of the steering wheel. During the movement of the steering wheel in an anti-clockwise direction, the spokes engage the arm 16 and in passing over the arm 16 tilt it into position B, and during this further tilting or ratcheting, the cam or arm 16 is restricted from longitudinal movement. As soon as the spoke 18 is free of the arm 16 of the Y formation, the spring-pressed plunger 24 returns the resetting member to position A, it being prevented from tilting beyond the position A back to the straightened position, by the fact that the spring-pressed balls 10 are seated in the depressions 11a, maintaining the switch in operated position. During the tilting of the resetting member from upright position into position B, the plunger 21 is forced off the flat bottom of the notch 22 onto a corner of the bottom of the notch, compressing spring 23, as seen in Figure 3. When the plunger 21 is thus out of the notch 22, the action of the spring 23 thereon tends to return the resetting member 14 to its normal position A. After the turn has been completed, and the driver straightens the steering wheel, the first spoke 18 to engage the arm 16 of the member 14 will tend to tilt the resetting member back to normal position, but as the cam 15 is fulcruming on the abutment 19, a starting impulse will be given to the lever 5 sufficient to return it to neutral position and force the balls 10 out of the depressions 11a, as the axial distance along the lever 5 between the pivot 6 and the resetting member is relatively small. After the starting impulse is thus given, the spring 23 acting on the plunger 21 is free to re-act and restore the resetting member 14 to its normal position, shown in full lines in Figure 3. The reverse of this operation takes place when the right hand turn is made in a clockwise direction, when the arm 17 of the Y formation is moved into the path of the spokes 18 and the arm or cam 15 coacts with the abutment 20.

What I claim is:

1. The combination with the steering wheel of a motor vehicle having a knock-off element movable therewith; of a direction indicator control mounted below the steering wheel and including an operating lever movable from neutral position in a plane substantially parallel to the plane of movement of the wheel, a resetting device carried by the lever and shiftable as a unit therewith out of neutral position and normally arranged out of the plane of movement of the knock-off element, and shiftable relatively to the lever to carry a portion thereof into the plane of movement of said element in a direction at a right angle to said plane, means for effecting relative movement when the lever is shifted from neutral position and for holding it from returning to normal position and permitting pivotal movement in one direction only to permit ratcheting of the knock-off element during turning of the wheel in one direction only, and means acting on the resetting member tending to return it to normal position, all whereby the resetting member is momentarily restrained from ratcheting during the turning of the steering wheel in the opposite direction and receives a starting impulse to return the lever to its neutral position.

2. The combination with the steering wheel of a motor vehicle having a knock-off element movable therewith; of a direction indicator control mounted below the steering wheel and including an operating lever movable from neutral position in a plane substantially parallel to the plane of movement of the wheel, a resetting member pivotally mounted on the lever on an axis extending lengthwise of the lever and extending upwardly therefrom and normally arranged with its upper end out of the path of movement of the knock-off element, means tending to yieldingly restrain pivotal movement of said member and return it to its normal position, the resetting member having an arm projecting below its axis, an abutment arranged to engage said arm and tilt the resetting member about its axis when the lever is moved from neutral position, and thereby move the upper end of the resetting member into the path of the knock-off element.

3. The combination with the steering wheel of a motor vehicle having a knock-off element movable therewith; of a direction indicator control mounted below the steering wheel and including an operating lever movable from neutral position in a plane substantially parallel to the plane of movement of the wheel, a resetting member carried by and movable with the lever and normally arranged out of the path of movement of the knock-off element and having a shifting movement relatively to the lever to carry a portion thereof into a position in the path of the knock-off element in a direction at an angle to the plane of movement of the knock-off device, the resetting member having a ratcheting movement relatively to the lever, when the lever is shifted from neutral position, spring means tending to return the resetting member to normal position relatively to the lever, and means arranged to coact with the resetting member and move the same relatively to the lever, when the lever is moved out of neutral position and to permit the ratcheting movement in one direction only.

4. The combination with the steering wheel of a motor vehicle having a knock-off element movable therewith; of a direction indicator control mounted below the steering wheel and including an operating lever movable from neutral position in a plane substantially parallel to the plane of movement of the steering wheel, a resetting member pivotally mounted on an axis extending lengthwise of the lever and extending upwardly therefrom with its upper end normally arranged below the plane of movement of the knock-off element, an abutment means arranged to engage said member below the pivotal axis thereof when the lever has been shifted from neutral and thereby tilt the resetting member about the lever and move the upper end thereof into the plane of movement of the knock-off element and hold it in tilted position, and means tending to return said member to is normal position, all whereby the knock-off element ratchets over the resetting member during turning of the steering wheel out of straight position and shoulders against the same to return the resetting member and lever to central position during the return movement of the steering wheel to straight position.

5. The combination with the steering wheel of a motor vehicle having a knock-off element movable therewith; of a direction indicator control mounted below the steering wheel and including an operating lever movable from neutral position in a plane substantially parallel to the plane of movement of the steering wheel, a resetting member pivotally mounted on an axis extending lengthwise of the lever and extending upwardly therefrom with its upper end normally arranged below the plane of movement of the knock-off element, an abutment arranged to engage said member below the pivotal axis thereof when the lever has been shifted from neutral and thereby tilt the resetting member about the lever and move the upper end thereof into the plane of movement of the knock-off element and hold it in tilted position, a spring-pressed plunger carried by the resetting member and the lever being provided with a seat with which the plunger coacts when the lever is in neutral position, the plunger being movable off the seat when the resetting member is tilted about the lever, all whereby the knock-off element ratchets over the resetting member during turning of the steering wheel out of straight position and shoulders against the same to return the resetting member and the lever to central position during the return movement of the steering wheel to straight position.

HARRY A. STEELE.